United States Patent
Lipke et al.

(10) Patent No.: US 10,725,795 B2
(45) Date of Patent: Jul. 28, 2020

(54) SYSTEMS, METHODS, AND APPARATUSES FOR DYNAMIC CREATION OF AN EXTERNAL CODE SEGMENT WITHIN A CLOUD BASED COMPUTING ENVIRONMENT

(71) Applicant: salesforce.com, inc., San Francisco, CA (US)

(72) Inventors: Nathan Edward Lipke, Denver, CO (US); Samuel William Bailey, Cardiff (GB); James Johnson, San Francisco, CA (US); Hugh Cockburn, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/051,419

(22) Filed: Jul. 31, 2018

(65) Prior Publication Data

US 2020/0042330 A1    Feb. 6, 2020

(51) Int. Cl.
*G06F 9/44*       (2018.01)
*G06F 9/445*      (2018.01)
*G06F 9/455*      (2018.01)

(52) U.S. Cl.
CPC ...... *G06F 9/44521* (2013.01); *G06F 9/45516* (2013.01)

(58) Field of Classification Search
None
See application file for complete search history.

(56) References Cited

U.S. PATENT DOCUMENTS

| 6,442,752 B1* | 8/2002 | Jennings | G06F 9/44521 717/162 |
| 2002/0147718 A1* | 10/2002 | Coutant | G06F 9/44521 |
| 2011/0231831 A1* | 9/2011 | Smith | G06F 8/65 717/170 |

OTHER PUBLICATIONS

Using Sawtooth with Docker: Configuring the List of Transaction Families, Apr. 6, 2018, 15 pages.

* cited by examiner

*Primary Examiner* — Craig C Dorais
(74) *Attorney, Agent, or Firm* — Elliot, Ostrander & Preston, P.C.

(57) ABSTRACT

Systems, methods, and apparatuses for implementing dynamic creation of an external code segment within a cloud based computing environment. For instance, an exemplary system having at least a processor and a memory therein includes means for executing object code comprising software instructions that when executed create an instance of an external segment of software instructions that is to perform business logic, wherein a name of the external segment of software instructions is to be first received during runtime of the object code.

20 Claims, 9 Drawing Sheets

```
{
    Map<String, Object> inputs = new Map<String, Object>();
    inputs.put('AccountID', myAccount);
    inputs.put('OpportunityID', myOppty);

Flow.Interview.Calculate_discounts myFlow =
        new Flow.Interview.Calculate_discounts(inputs);
    myFlow.start();
}
```

FIG. 3 – PRIOR ART

```
public void callFlow(String flowName, Map<String, Object> inputs) {
    Flow.Interview myFlow = Flow.Interview.createInterview(flowName, inputs);
    myFlow.start();
}
```

FIG. 4

```
{
Map<String, Object> inputs = new Map<String, Object>();
inputs.put('AccountID', myAccount);
inputs.put('OpportunityID', myOppty);

Flow.Interview.myNamespace.Calculate_discounts myFlow =
    new Flow.Interview.myNamespace.Calculate_discounts(inputs);
myFlow.start();
}
```

FIG. 5 – PRIOR ART

```
public void callFlow(String namespace, String flowName, Map <String, Object> inputs) {
    Flow.Interview myFlow = Flow.Interview.createInterview(namespace, flowName, inputs);
    myFlow.start();
}
```

FIG. 6

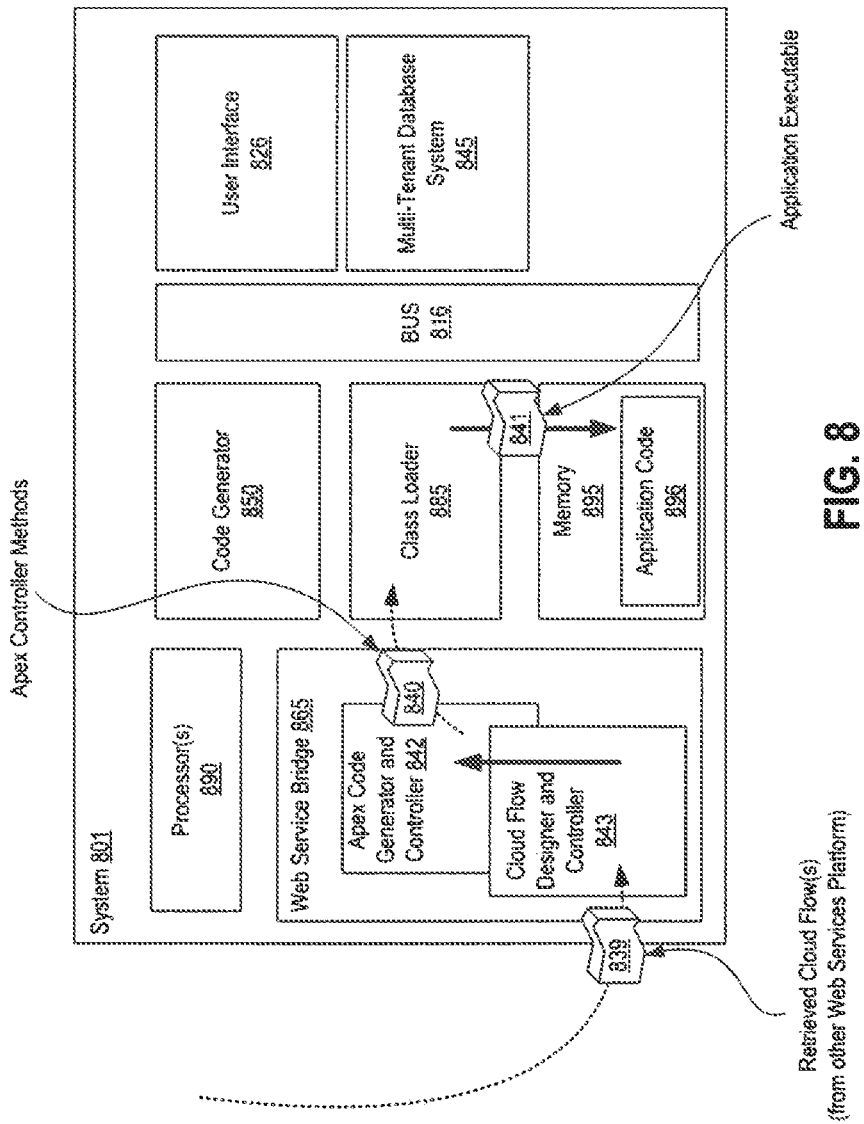

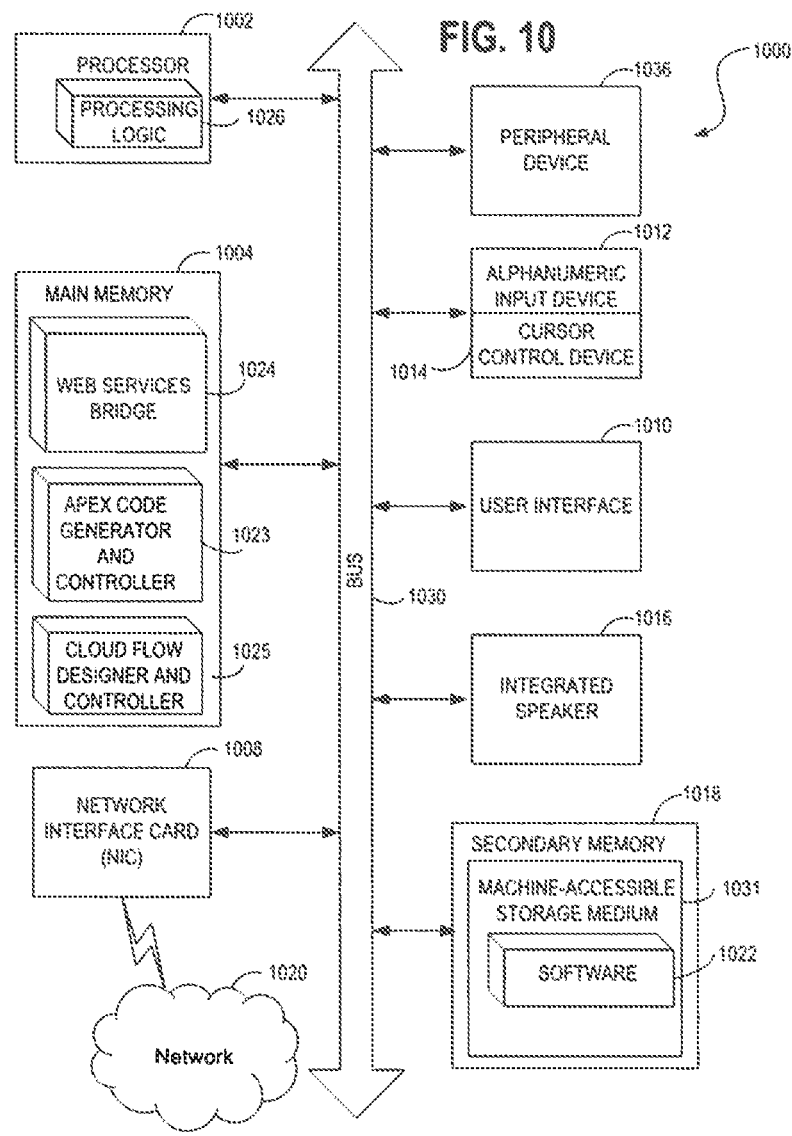

SYSTEMS, METHODS, AND APPARATUSES FOR DYNAMIC CREATION OF AN EXTERNAL CODE SEGMENT WITHIN A CLOUD BASED COMPUTING ENVIRONMENT

CLAIM OF PRIORITY

None.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for implementing dynamic creation of an external code segment within a cloud based computing environment such as a database system implementation supported by a processor and a memory to execute such functionality. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section is not to be assumed as prior art merely as a result of its mention in the background section. Similarly, a problem mentioned in the background section or associated with the subject matter of the background section is not assumed to have been previously recognized in the prior art. The subject matter in the background section merely represents different approaches, which in and of themselves may also correspond to claimed embodiments.

In the prior art, software classes are written in which calls to an external code segment, such as a cloud flow in a cloud computing system, require knowledge of the name of the external code segment, and hardcoding of the same into the class, such that the name of the external code segment is already known at compile time and run time. This presents a problem if the cloud flow is not known at the time of writing or compilation of the class. When an instance of the class is executed as object code, there is a need to obtain the name of the cloud flow during execution of the object code in order to invoke an instance of the cloud flow. If the cloud flow is a headless flow, that is, if there is no user input or opportunity for user input, it is not possible to obtain the name of the cloud flow when it is time to invoke the cloud flow from within the executable object code.

The present state of the art may therefore benefit from the systems, methods, and apparatuses for implementing dynamic creation and invocation of an external code segment within a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 3 is a prior art listing of source code;

FIG. 4 is a listing of source code in accordance with an embodiment of the invention;

FIG. 5 is a prior art listing of source code;

FIG. 6 is a listing of source code in accordance with an embodiment of the invention;

FIG. 8 shows a diagrammatic representation of a system within which embodiments may operate, be installed, integrated, or configured;

FIG. 10 illustrates a diagrammatic representation of a machine in the exemplary form of a computer system, in accordance with one embodiment.

DETAILED DESCRIPTION

Figure 1:
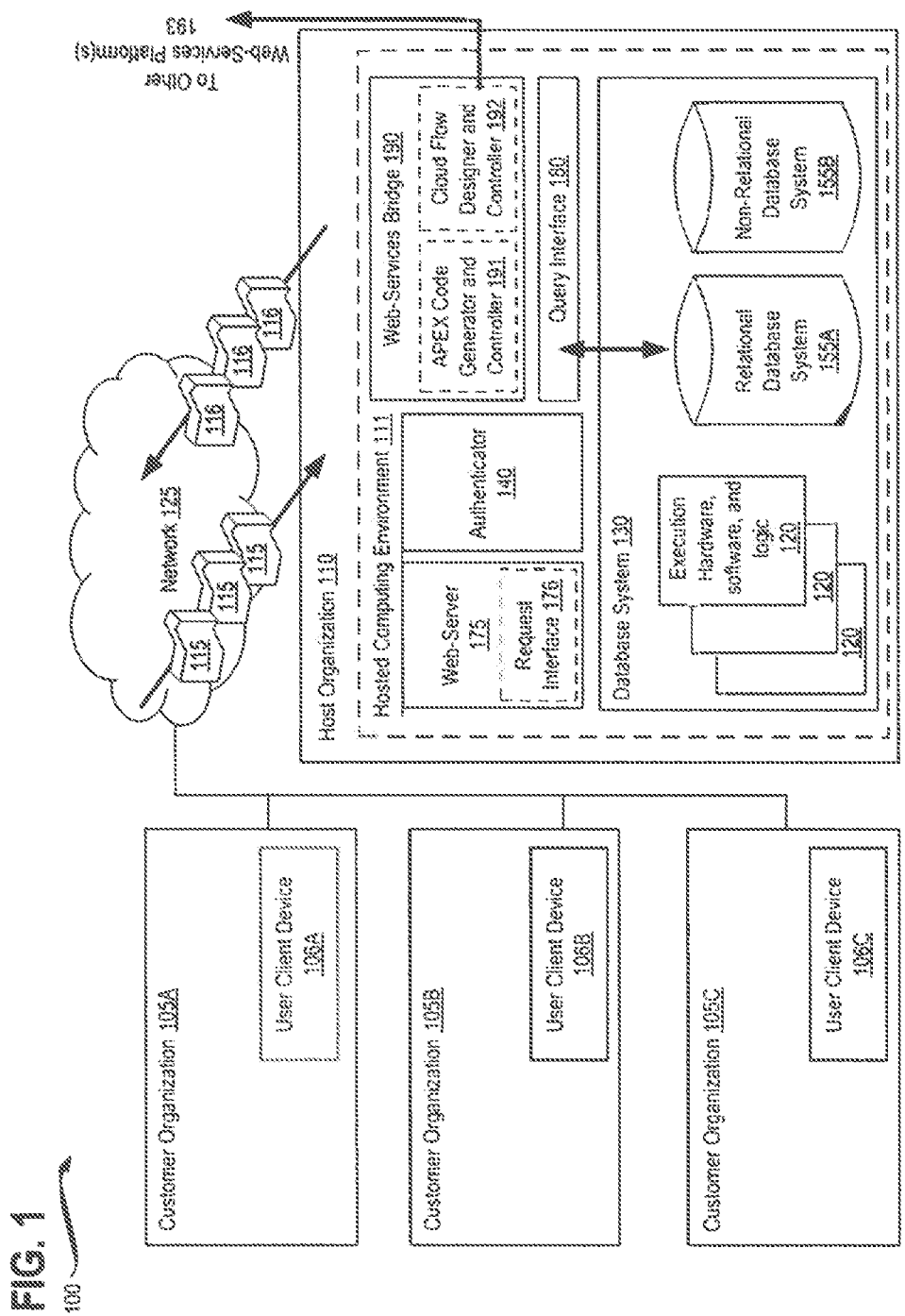
FIG. 1 depicts an exemplary architecture in accordance with described embodiments.

Described herein are systems, methods, and apparatuses for implementing dynamic creation and invocation of an external code segment from object code executing within a cloud based computing environment. For instance, such an exemplary system having a processor and a memory therein includes executing object code comprising software instructions that when executed create an instance of an external segment of software instructions that is to perform business logic, wherein a name of the external segment of software instructions is to be first received during runtime of the object code. The object code comprises software instructions to receive a value that is the name of the external segment of software instructions, bind the received value as the name of the external segment of software instructions to be invoked, thereby creating a named external segment of software instructions, and create an instance of the named external segment of software instructions responsive to binding the received value as the name of the external segment of software instructions to be invoked.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 which communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is the web-services bridge 190 having therein both an Apex code generator and controller 191 and also a Cloud Flow Designer and Controller 192 capable of communicating with other web-services platform(s) 193 which regardless of whether such web-services platforms are hosted by the same host organizations 110 or hosted by different host organizations.

As described above, cloud computing, i.e., the cloud, a hosted computing environment, is an information technology (IT) model that enables ready access to shared, configurable, system resources (i.e., any physical or virtual component such as file handles, network connections or sockets, memory areas, etc., within, or devices connected to, a computer system) and higher-level services that can be quickly provisioned with minimal management effort, typically over the Internet. Third-party clouds operated by cloud service providers enable organizations to focus on their core businesses instead of expending resources on computer infrastructure and maintenance.

The assignee of this invention, Salesforce, allows organizations to conduct business by moving enterprise applications that were traditionally client-server-based "into the cloud", in particular, by moving the enterprise applications to the Salesforce Lightning Platform, an on-demand, multitenant Web environment. This environment enables organizations to run and customize applications, such as Salesforce Automation and Service and Support, and build new custom applications based on particular business needs.

Apex Programming Language

While many customization options are available through the Salesforce.org cloud computing (or simply, Salesforce) user interface, such as the ability to define new fields, objects, workflow, and approval processes, developers can also use the Simple Object Access Protocol (SOAP) Application Programmatic Interface (API) to issue data manipulation commands such as delete( ), update( ) or insert( ), from client-side programs.

These client-side programs, typically written in Java, JavaScript, Microsoft .NET, or other programming languages, provide organizations with more flexibility in their customizations. However, because the controlling logic for these client-side programs is not located on Salesforce cloud servers, the logic is restricted by the performance costs of making multiple round-trips to the Salesforce site to accomplish common business transactions, and by the cost and complexity of hosting server code, such as Java or .NET, in a secure and robust environment.

In contrast, Apex is a strongly typed, object-oriented, multitenant, on-demand programming language that allows developers to execute flow and transaction control statements on a Salesforce Lightning Platform server, in conjunction with calls to an application programmatic interface (API). Using syntax similar to Java and acting like database stored procedures, Apex allows developers to add business logic to many system events, including, for example, button clicks, related record updates, and Visualforce pages. An organization can access features of the Salesforce user interface programmatically in Apex, and can integrate with external SOAP and Representational State Transfer (REST) Web services. Apex code can be run using a variety of mechanisms, such as Web service requests, triggers on objects, asynchronously, and in atomic transactions.

Salesforce prebuilt applications provide Customer Relationship Management (CRM) functionality. In addition, Salesforce provides the ability to customize the prebuilt applications to fit an organization's needs. However, the organization may have complex business processes that are unsupported by the existing functionality. In such case, the Salesforce Lightning Platform provides the Apex programming language as a way for administrators and developers to build custom functionality. Apex code runs entirely on-demand on the Lightning Platform. Developers write and save Apex code to the platform, and end users trigger the execution of the Apex code via the user interface. The Apex code is saved and runs in the cloud, on the multitenant platform.

Writing Apex code is similar writing Java code, but for the Salesforce Lightning Platform. Apex code enables organizations to add and interact with data in the Lightning Platform persistence layer. The Apex language uses classes, data types, variables, and if-else statements, similar to Java. Likewise, Apex classes are modeled on their counterparts in Java. A developer can define, instantiate, and extend classes. A class is a template or blueprint from which objects are created. An object is an instance of a class.

Visualforce

Visualforce is a component of Force.com, Salesforce's Platform-as-a-Service (PaaS) offering. With Visualforce, companies and their developers can create any kind of user experience and deliver it on demand via the Web, without the need for their own software. By leveraging the database, integration, and logic capabilities of Force.com, Visualforce provides control over the user interface of any application built on the platform so it can be tailored for any requirement, user, or device. With Visualforce, the Platform as a Service (PaaS) model can extend to any application and business requirement.

Visualforce provides developers with standard Web development technologies, including HyperText Markup Language (HTML), Cascaded Style Sheets (CSS), JavaScript, and jQuery, to create user interfaces for cloud-computing applications. Based on a Model-View-Controller (MVC) architectural model, these interfaces can be brought together with Apex code, the Force.com platform's on-demand programming language, described above. As a result, Visualforce offers control over the definition of an interface, and makes it possible to create new and advanced user interactions based on wizards, branching, and other user interface (UI) logic.

Customers can use Force.com to customize existing applications and create new on-demand applications, both for CRM and to support other business requirements. For example, approaches to on-demand applications may range from simple actions such as customizing an order entry form in an existing CRM application to creating entirely new applications that will run on kiosks or mobile devices such an iPhone or Android smartphone.

Figure 2:
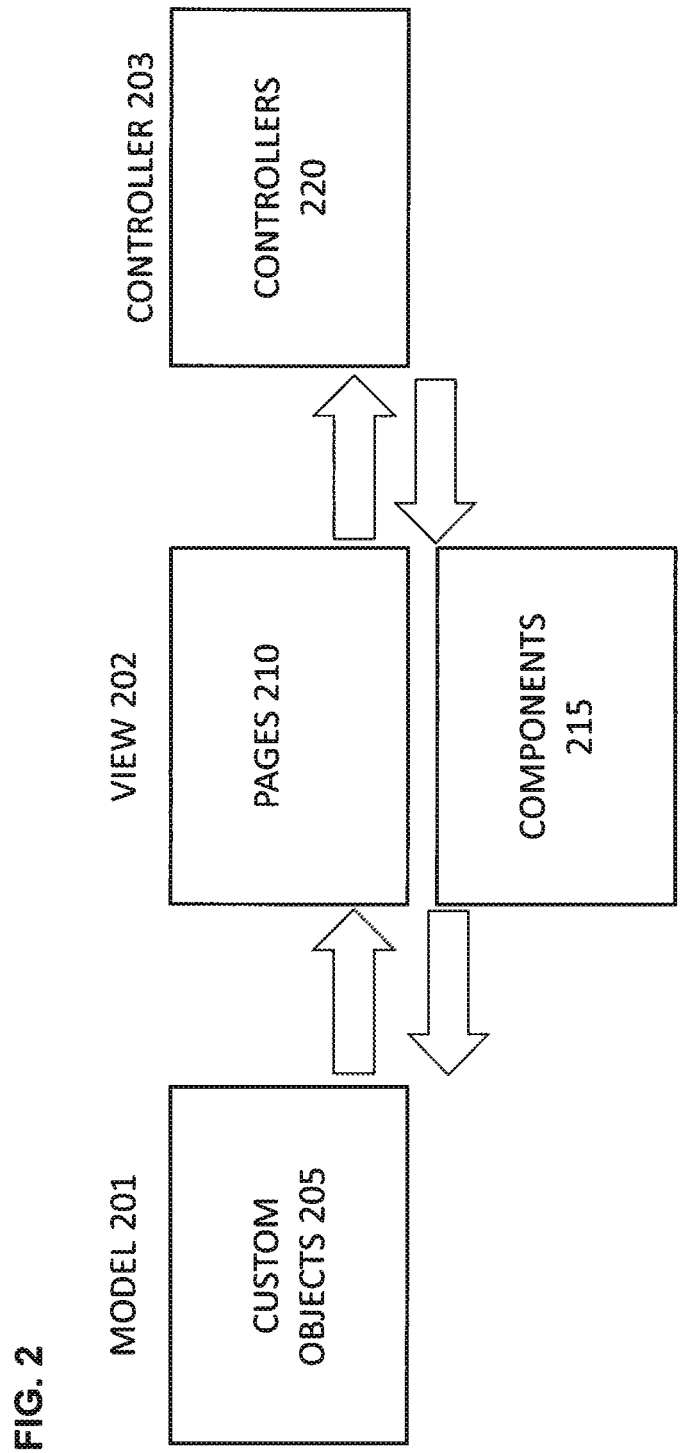
FIG. 2 is a diagram of a model-view-controller paradigm as used in an embodiment of the invention.

Visualforce is an on-demand implementation of an MVC architecture, a widely used interface architecture based on the separation of data presentation from data manipulation. In such an architecture, with reference to FIG. 2, the model 201 represents the data model, the view 202 represents the presentation of the data (user interface), and the controller 203 represents the business logic that manipulates the data and controls the user interface. In Visualforce, the MVC model is implemented with standard and custom objects 205, as well as with pages 210, components 215, and controllers 220.

Pages 210, along with components 215, are the basic creative building blocks for application designers. Similar to a standard Web page, a Visualforce page uses HTML to specify the appearance of the application's interface, with the option of using other Web technologies such as CSS, JavaScript, and jQuery for additional flexibility. Pages are referenced and invoked via a unique Uniform Resource Locator (URL), just as they would be on a traditional application server. This standard markup is complemented by Visualforce components 215. These components, which are similar to tag libraries in other systems, make it possible to invoke complex components with a single line of HTML. Because these components are composed and rendered on the server and then delivered to the client, this approach provides better performance and enhanced functionality compared to client-only techniques.

Components 215, which are invoked with special HTML tags, provide for reusing common interface elements and for binding both standard and custom elements to data. Visualforce provides many predefined components that can be assembled with minimal coding, in building-block fashion. Some components implement common Salesforce interface elements, while others make available new features such as Asynchronous JavaScript and XML-(AJAX-) based partial page refreshes. Components may provide various levels of granularity, such as displaying multiple lines of data or executing embedded functionality of an application's metadata on a Visualforce page. All components can be captured in style sheets, to make it straightforward to change a component's style regardless of how it was created.

Controllers 220 are the basic functional building blocks that control an application's logic. Implemented in Apex code, controllers provide the underlying business rules for the interface, as well as a connection between the application's page presentation and the underlying data. Any given page interacts with a given controller through components, which bring in the data to be displayed in the interface and send it out to be stored in the database. The controller provides access to the data and specifies what happens when the user interacts with an interface component. Visualforce provides pre-built, standard controllers for standard interactions such as View, Edit, and Save, which can be implemented without additional coding. New behaviors or features that go beyond these predefined interactions can be programmed as custom or advanced controllers in Apex to access new data sources, navigation elements, and behaviors. Because custom controllers can maintain state across page interactions, it is possible to construct interactions such as wizards, whose logic spans steps on multiple pages.

A Visualforce controller is a set of instructions that specify what happens when a user interacts with the components specified in associated Visualforce markup, such as when a user clicks a button or link. Controllers also provide access to the data that should be displayed in a page, and can modify component behavior. A developer can either use a standard controller provided by the Salesforce Lightning Platform, or add custom or advanced controller logic with a class written in Apex. A standard controller consists of the same functionality and logic that is used for a standard Salesforce page. For example, if one uses the standard Accounts controller, clicking a "Save" button in a Visualforce page results in the same behavior as clicking "Save" on a standard Account edit page. A custom or advanced controller is a class written in Apex that implements all of a page's logic, without leveraging a standard controller. If one uses a custom controller, new navigation elements or behaviors may be defined, but any functionality that was already provided in a standard controller must also be re-implemented.

Like other Apex classes, custom controllers execute entirely in system mode, in which the object and field-level permissions of the current user are ignored. One can specify whether a user can execute methods in a custom controller based on the user's profile. A controller extension is a class written in Apex that adds to or overrides behavior in a standard or custom controller. Extensions allow one to leverage the functionality of another controller while adding their own custom logic. Because standard controllers execute in user mode, in which the permissions, field-level security, and sharing rules of the current user are enforced, extending a standard controller allows one to build a Visualforce page that respects user permissions. Although the extension class executes in system mode, the standard controller executes in user mode. As with custom controllers, one can specify whether a user can execute methods in a controller extension based on the user's profile.

Flow Namespace

The Flow namespace provides a class for advanced Visualforce controller access to automated business processes by building cloud flows, or simply, flows, that collect, update, edit, and create, Salesforce information, and then make those flows available to particular users or systems. A flow is a software application that automates a business process, for example, by collecting data and doing something in a Salesforce organization (org) or an external system. (A Salesforce org, or organization, is a logical instance of data and metadata for a set of users.) For example, the flow can execute logic, interact with a database, call software programming language classes, e.g., Apex classes, and collect data from users.

Flows can either require user interaction, e.g., a wizard or guided user interface (UI) for data entry, or run in the background on their own, e.g., a process that automatically transfers records when a user's role changes. Flows without user interaction are referred to herein as headless flows. The assignee of the current invention provides tools to automate several kinds of business processes: guided visual experiences, behind-the-scenes automation, and approval automation. In some embodiments, the tools do not require one to actually write code. Instead, one uses a point-and-click and/or drag- and drop user interface to build the flow. For example, if a record has certain values, the assignee of the current invention provides three tools that may be used: Workflow, Process Builder, and Cloud Flow Designer. These tools allow one to create workflow rules, processes, and flows.

Workflow provides for automating standard internal procedures and processes to save time across an organization. A workflow rule is the main container for a set of workflow instructions. These instructions may be summed up in an if/then statement. Process Builder provides for configuring various repetitive aspects of standard processes, such as assigning tasks, sending emails, and updating records, to be performed automatically. Process Builder helps one automate business processes and provides a graphical representation as it is being built. Cloud Flow Designer is a cloud-based point-and-click tool or application that provides for administrators automating business processes by building or creating flows. When the administrator understands the process that they want to automate, the can design a flow in the Cloud Flow Designer for that process. Flows can be executed in several ways, depending on for whom the flow is designed. Internal users, external users, or systems can run a flow, or a flow can be deployed for another organization.

A running instance of a flow is termed herein as a flow interview. A flow is an application built by an administrator that asks a user for inputs and does something in the Salesforce org based on those inputs. For example, a flow could provide a call script for customer support calls and use the information a user provides to create a case. What the flow does with the provided information is up to the administrator. When a user runs a flow interview, whether through a link, button, or tab, they are running a single instance of a flow.

The Interview class in the Flow namespace, Flow.Interview class, provides advanced controller access to flows and the ability to start a flow. A running instance of a flow is referred to as an interview. There are two ways to create an Interview object:
1) With reference to FIGS. 3 and 5, create the object directly in the class by using:

---
no namespace: Flow.Interview.flowName; or
namespace: Flow.Interview.namespace.flowName
---

2) According to an embodiment of the invention, and with reference to FIG. 4, create the object dynamically by using the createInterview( ) Apex programming language command.

The following examples are sample controllers that start an interview for the flow from a hypothetical "build a discount calculator" Apex class, based on whether the interview is created statically, with Flow.Interview.myFlow, or, according to an embodiment of the invention, whether the interview is created dynamically, with createInterview( ), and whether the flow is a managed or local flow.

With reference to FIG. 3, an interview is created statically for a local flow. In particular, the statement:

---
Flow.Interview.Calculate_discounts myFlow = new Flow.Interview.Calculate_discounts(inputs);
--- provides controller access to a flow named "Calculate_discounts", and creates an interview—an instance of the flow—with the statement:

myFlow.start( );

In this example, the name of the flow is known at the time of writing the Apex code that will call the flow. The flow name is embedded in—hard-coded into—the Apex class at the time the Apex code is written.

In contrast, and in accordance with an embodiment of the invention, as illustrated in FIG. 4, the Apex code is written in such a way that the name of the flow need not be known at the time of writing or compiling the Apex code. The class can make a call to any flow based on a value input at runtime that identifies the flow. Thus, an interview is created dynamically for a local flow with the statements:

---
public void callFlow(String flowName, Map <String, Object> inputs) {
    Flow.Interview myFlow = Flow.Interview.createInterview(flowName, inputs);
myFlow.start( );
---

In particular, the name of the flow is received (that is, the name of the flow is passed in as the argument in "String flowName") at runtime when the following statement is executed:

---
public void callFlow(String flowName, Map <String, Object> inputs) {
    Flow.Interview myFlow = Flow.Interview.createInterview(flowName, inputs);
--- and the interview of the flow is then created at run time when the following statement is executed:
    myFlow.start( );
As such, the name of the flow is passed in to the class as a variable, so that the flow can be initiated and invoked by passing in a variable obtained from another system.

Salesforce provides for managed flows in connection with managed packages, where a third party developer may write an application for Salesforce and make it available or sell it to others. The fact that these packages are managed packages are hidden from the customer that is purchasing the software. However, the customer can still call the managed package. To call it, the managed package needs a globally unique namespace to identify the package as opposed to another package created by another developer. To that end, the Salesforce application supports the use of namespace prefixes. Namespace prefixes are used in managed AppExchange packages to differentiate custom object and field names from those in use by other organizations.

After a developer registers a globally unique namespace prefix and registers it with AppExchange registry, external references to custom object and field names in the developer's managed packages take on the following long format:
    namespace_prefix_obj_or_field_name_c
Because these fully-qualified names can be onerous to update in working SOQL statements, SOSL statements, and Apex once a class is marked as "managed," Apex supports a default namespace for schema names. When looking at identifiers, the parser considers the namespace of the current object and then assumes that it is the namespace of all other objects and fields unless otherwise specified. Consequently, a stored class should refer to custom object and field names directly (using obj_or_field_name_c) for those objects that are defined within its same application namespace.

When calling a flow in a managed package from an Apex class, the managed package has an additional namespace included in the relevant statements. For example, with reference to FIG. 5, an interview is created statically for a managed flow as follows.

```
Flow.Interview.myNamespace.Calculate_discounts myFlow =
    new Flow.Interview.myNamespace.Calculate_discounts(inputs);
myFlow.start( );
```

According to an embodiment of the invention, with reference to FIG. 6, an interview is created dynamically for a managed flow as follows.

```
public void callFlow(String namespace, String flowName, Map
<String, Object> inputs) {
Flow.Interview myFlow = Flow.Interview.createInterview(namespace,
flowName, inputs);
myFlow.start( );
}
```

As such, the name, and the namespace, of the flow are both passed in as variables, so that the flow can be initiated and invoked by passing in the variable obtained from another system.

Figure 7:
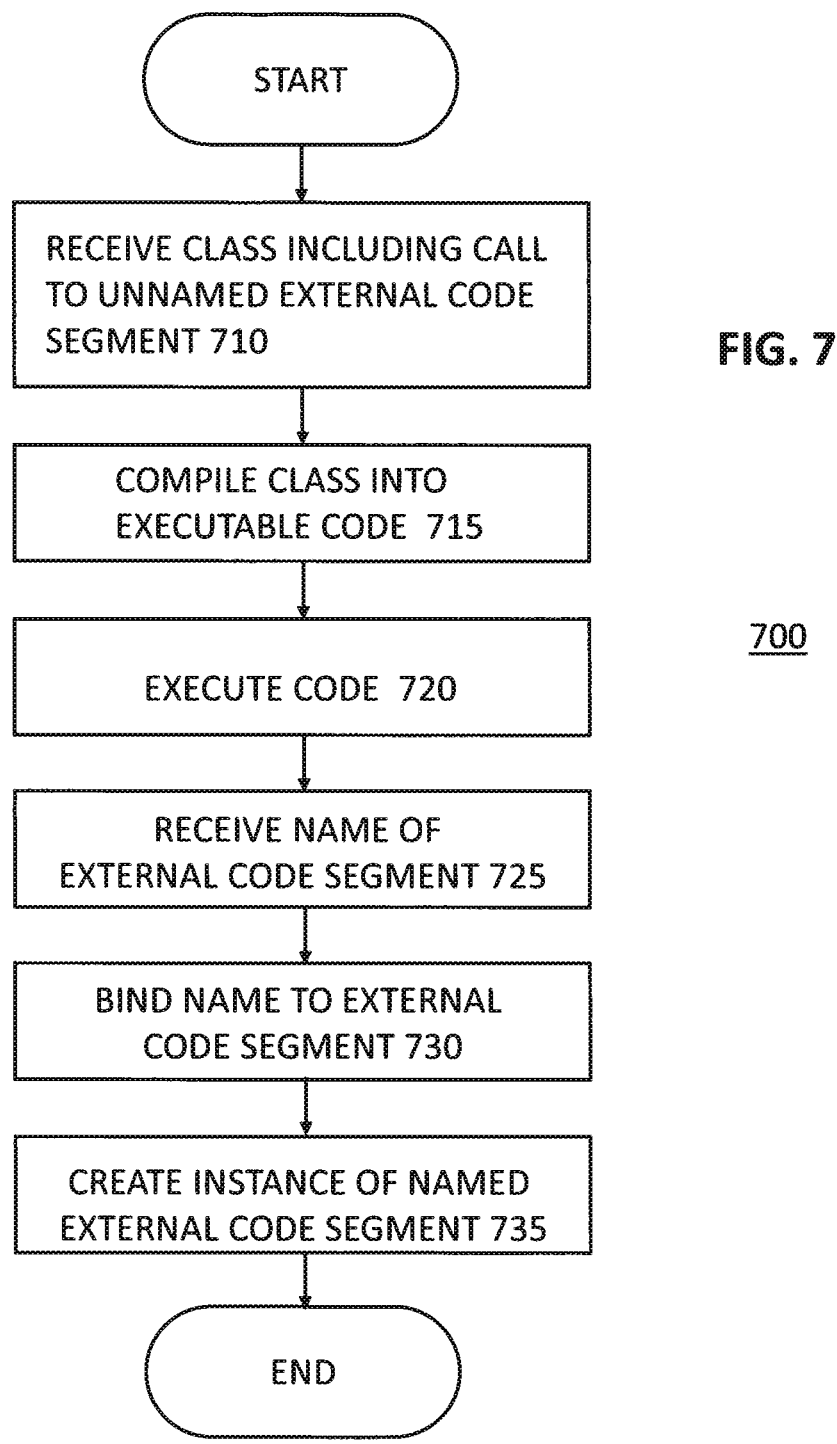
FIG. 7 is a flow chart of a dynamic creation and invocation of an external code segment from object code executing within a cloud based computing environment, in accordance with an embodiment of the invention.

FIG. 7 depicts a flow diagram illustrating a general method 700 for implementing dynamic creation and invocation of an external code segment from object code executing within a cloud based computing environment in accordance with disclosed embodiments. Method 700 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, the web-services bridge 190, and its database system 130 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 700 depicted at FIG. 7, at 710, processing logic involves receiving a class, e.g., an Apex class, including software instructions that when executed create the instance of the named external segment of software instructions, i.e., creating an interview of a cloud flow, that is to perform business logic, wherein the name of the external segment of software instructions is not known at the time of writing the class. The received class may be written by the cloud services provider, or a third party developer.

At block 715, processing logic compiles the class into executable code, and at block 720, processing logic provides for execution of the executable code. At this point in time, the name of the external segment of software instructions is not yet known.

At block 725, processing logic receives a value that is the name of the external segment of software instructions (e.g., the value is the name of a cloud flow) and at block 730, processing logic binds the received value as the name of the external segment of software instructions thereby creating a named external segment of software instructions.

At block 735, processing logic creates an instance of the named external segment of software instructions (i.e., creates an interview of a cloud flow) responsive to binding the received value as the name of the external segment of software instructions. In one embodiment, in addition to receiving the name of the external segment of software instructions (e.g., a name of a cloud flow) at block 725, the embodiment further receives a globally unique namespace prefix associated with the name of the cloud flow at block 725. In such an embodiment, the processing logic at 735 creates an interview of the named cloud flow associated with the received globally unique namespace prefix. In any case, the flow then executes before control is returned to the executable code, e.g., of the Apex class.

FIG. 8 shows a diagrammatic representation of a system 801 within which embodiments may operate, be installed, integrated, or configured. In accordance with one embodiment, there is a system 801 having at least a processor 890 and a memory 895 therein to execute implementing application code 896. Such a system 801 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 801, which may operate within a host organization, includes the processor 890 and the memory 895 to execute instructions at the system 801. According to such an embodiment, the system 801 further includes a processor and a memory to execute instructions at the system, and software instructions that when executed by the processor create an instance of an external segment of software instructions that is to perform business logic, wherein a name of the external segment of software instructions is to be first received during runtime of the object code. In particular, the object code comprises software instructions to receive a value that is the name of the external segment of software instructions, bind the received value as the name of the external segment of software instructions thereby creating a named external segment of software instructions, and create an instance of the named external segment of software instructions responsive to binding the received value as the name of the external segment of software instructions.

According to another embodiment of the system 801, a user interface 826 operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives inputs from the client device to design the application as a request for services from the cloud based service provider.

Bus 816 interfaces the various components of the system 801 amongst each other, with any other peripheral(s) of the system 801, and with external components such as external network elements, other machines, client devices, cloud computing services, etc. Communications may further include communicating with external devices via a network interface over a LAN, WAN, or the public Internet.

Figure 9A:
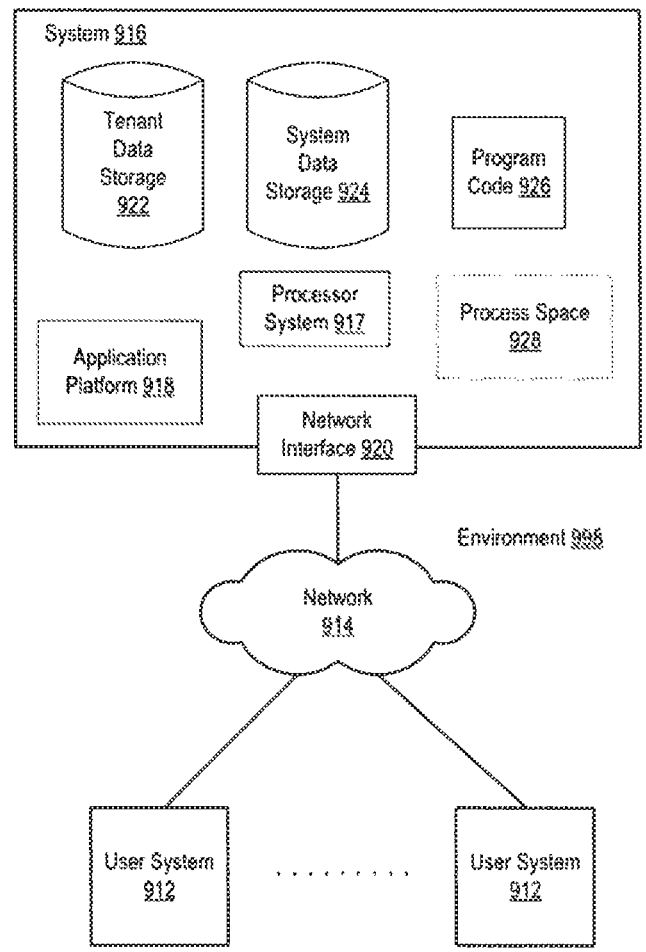
FIG. 9A illustrates a block diagram of an environment in which an on-demand database service may operate in accordance with the described embodiments.

FIG. 9A illustrates a block diagram of an environment 998 in which an on-demand database service may operate in accordance with the described embodiments. Environment 998 may include user systems 912, network 914, system 916, processor system 917, application platform 918, network interface 920, tenant data storage 922, system data storage 924, program code 926, and process space 928. In other embodiments, environment 998 may not have all of the components listed and/or may have other elements instead of, or in addition to, those listed above.

Environment 998 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9A (and in more detail in FIG. 9B) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" is used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9A, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9A, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9A include conventional, well-known elements that are explained only briefly here. For example, each user system 912 may include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9B:
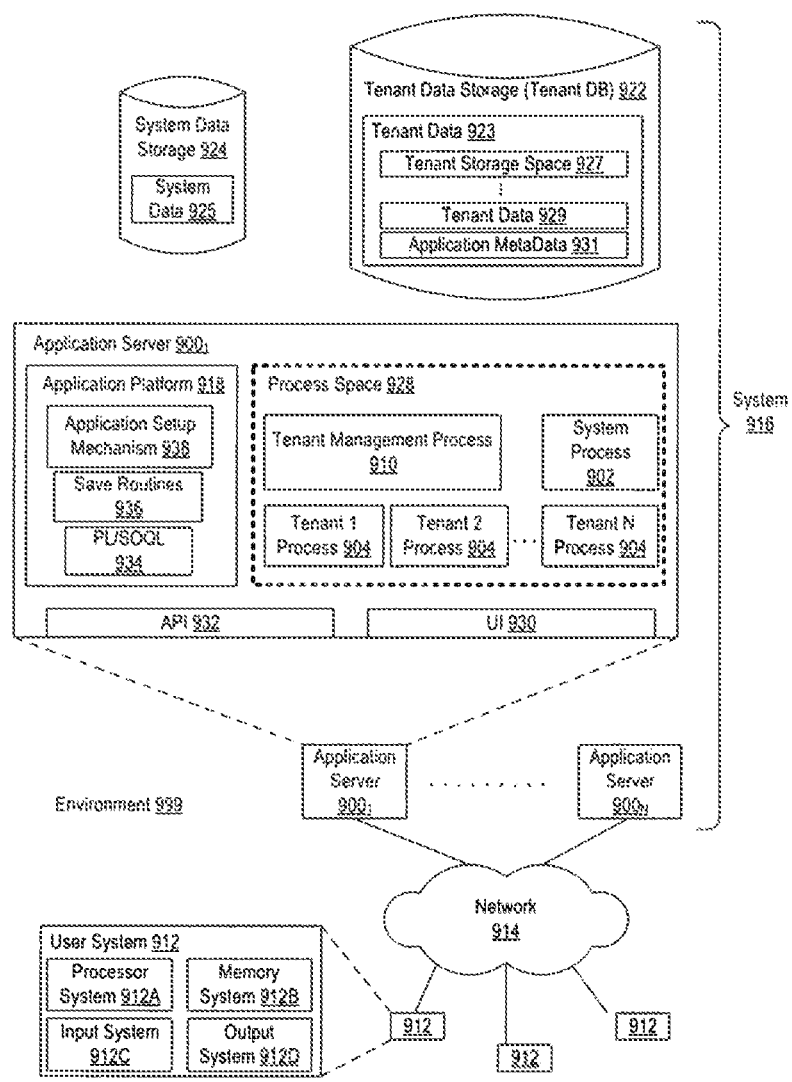
FIG. 9B illustrates another block diagram of an embodiment of elements of FIG. 9A and various possible interconnections between such elements in accordance with the described embodiments.

FIG. 9B illustrates another block diagram of an embodiment of elements of FIG. 9A and various possible interconnections between such elements in accordance with the described embodiments. FIG. 9B also illustrates environment 999. However, in FIG. 9B, the elements of system 916 and various interconnections in an embodiment are illustrated in further detail. More particularly, FIG. 9B shows that user system 912 may include a processor system 912A, memory system 912B, input system 912C, and output system 912D. FIG. 9B shows network 914 and system 916. FIG. 9B also shows that system 916 may include tenant data storage 922, having therein tenant data 923, which includes, for example, tenant storage space 927, tenant data 929, and application metadata 931. System data storage 924 is depicted as having therein system data 925. Further depicted within the expanded detail of application servers $900_{1-N}$ are User Interface (UI) 930, Application Program Interface (API) 932, application platform 918 includes PL/SOQL 934, save routines 936, application setup mechanism 938, process space 928 includes system process space 902, tenant 1-N process spaces 904, and tenant management process space 910. In other embodiments, environment 999 may not have the same elements as those listed above and/or may have other elements instead of, or in addition to, those listed above.

User system 912, network 914, system 916, tenant data storage 922, and system data storage 924 were discussed above in FIG. 9A. As shown by FIG. 9B, system 916 may include a network interface 920 (of FIG. 9A) implemented as a set of HTTP application servers 900, an application platform 918, tenant data storage 922, and system data storage 924. Also shown is system process space 902, including individual tenant process spaces 904 and a tenant management process space 910. Each application server 900 may be configured to tenant data storage 922 and the tenant data 923 therein, and system data storage 924 and the system data 925 therein to serve requests of user systems 912. The tenant data 923 might be divided into individual tenant storage areas (e.g., tenant storage space 927), which can be either a physical arrangement and/or a logical arrangement of data. Within each tenant storage space 927, tenant data 929, and application metadata 931 might be similarly allocated for each user. For example, a copy of a user's most recently used (MRU) items might be stored to tenant data 929. Similarly, a copy of MRU items for an entire organization that is a tenant might be stored to tenant storage space 927. A UI 930 provides a user interface and an API 932 provides an application programmer interface into system 916 resident processes to users and/or developers at user systems 912. The tenant data and the system data may be stored in various databases, such as one or more Oracle™ databases.

Application platform 918 includes an application setup mechanism 938 that supports application developers' creation and management of applications, which may be saved as metadata into tenant data storage 922 by save routines 936 for execution by subscribers as one or more tenant process spaces 904 managed by tenant management process space 910 for example. Invocations to such applications may be coded using PL/SOQL 934 that provides a programming language style interface extension to API 932. Invocations to applications may be detected by one or more system processes, which manages retrieving application metadata 931 for the subscriber making the invocation and executing the metadata as an application in a virtual machine.

Each application server 900 may be communicably coupled to database systems, e.g., having access to system data 925 and tenant data 923, via a different network connection. For example, one application server $900_1$ might be coupled via the network 914 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 912 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user may hit three different application servers 900, and three requests from different users may hit the same application server 900. In this manner, system 916 is multi-tenant, in which system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 900 to request and update system-level and tenant-level data from system 916 that may require sending one or more queries to tenant data storage 922 and/or system data storage 924. System 916 (e.g., an application server 900 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 10 illustrates a diagrammatic representation of a machine 1000 in the exemplary form of a computer system, in accordance with one embodiment, within which a set of instructions, for causing the machine/computer system 1000 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018

(e.g., a persistent storage device including hard disk drives and a persistent database and/or a multi-tenant database implementation), which communicate with each other via a bus 1030. Main memory 1004 includes a web services bridge 1024, Apex code generator 1023, and Cloud Flow Designer and Controller 1025 by which to communicate with another web services platform, retrieve, and execute cloud flows provided by the web service at the other web services platform in accordance with described embodiments. Main memory 1004 and its sub-elements are operable in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, wherein the method comprises:
    executing object code comprising software instructions that when executed create an instance of an external segment of software instructions that is to perform business logic, wherein a name of the external segment of software instructions is to be first received during runtime of the object code;
    wherein the software instructions that when executed create an instance of an external segment of software instructions that is to perform business logic comprises software instructions that:
    receive a name of a cloud flow; and
    create an interview of the named cloud flow.

2. The method of claim 1, wherein the object code comprises software instructions to:
    receive a value that is the name of the external segment of software instructions;
    create a named external segment of software instructions by binding the received value as the name of the external segment of software instructions; and
    create an instance of the named external segment of software instructions responsive to binding the received value as the name of the external segment of software instructions.

3. A method performed by a system having at least a processor and a memory therein, wherein the method comprises:
    executing object code comprising software instructions that when executed create an instance of an external segment of software instructions that is to perform business logic, wherein a name of the external segment of software instructions is to be first received during runtime of the object code;
    wherein the object code comprises software instructions to:
        (i) receive a value that is the name of the external segment of software instructions,
        (ii) create a named external segment of software instructions by binding the received value as the name of the external segment of software instructions, and
        (iii) create an instance of the named external segment of software instructions responsive to binding the received value as the name of the external segment of software instructions; and
    wherein the method further comprises receiving a class including software instructions that when executed create the instance of the named external segment of software instructions that is to perform business logic, wherein the name of the external segment of software instructions is not known at the time of receiving the class.

4. The method of claim 3, further comprising compiling the class into the object code for execution.

5. The method of claim 3, wherein receiving the class comprises receiving the class as written in a multi-tenant, on-demand, programming language to be executed by the processor on a cloud-computing platform server.

6. The method of claim 3, wherein the software instructions that when executed create an instance of an external segment of software instructions that is to perform business logic comprises software instructions that:
  receive a name of a cloud flow; and
  create an interview of the named cloud flow.

7. The method of claim 6, further comprising software instructions that receive a globally unique namespace prefix associated with the name of the cloud flow, and wherein the software instructions that create an interview of the named cloud flow include software instructions to create an interview of the named cloud flow associated with the received globally unique namespace prefix.

8. A system to execute within a host organization, wherein the system comprises:
  a processor and a memory to execute instructions at the system;
  object code comprising software instructions that when executed by the processor create an instance of an external segment of software instructions that is to perform business logic, wherein a name of the external segment of software instructions is to be first received during runtime of the object code;
  wherein the software instructions that when executed by the processor to create an instance of an external segment of software instructions that is to perform business logic comprises software instructions that:
  receive a name of a cloud flow; and
  create an interview of the named cloud flow.

9. The system of claim 8, wherein the object code comprises software instructions to:
  receive a value that is the name of the external segment of software instructions;
  create a named external segment of software instructions by binding the received value as the name of the external segment of software instructions; and
  create an instance of the named external segment of software instructions responsive to binding the received value as the name of the external segment of software instructions.

10. The system of claim 9, wherein the name of the external segment of software instructions is not hard-coded at the time of receiving a class from which the object code is instantiated.

11. The system of claim 10:
  wherein the system is further configured to receive a class including software instructions that when executed create the instance of the named external segment of software instructions that is to perform business logic; and
  wherein the class is written in a multi-tenant, on-demand, programming language to be executed by the processor on a cloud-computing platform server.

12. The system of claim 8, further comprising software instructions that receive a globally unique namespace prefix associated with the name of the cloud flow, and wherein the software instructions that create an interview of the named cloud flow include software instructions to create an interview of the named cloud flow associated with the received globally unique namespace prefix.

13. Non-transitory computer readable storage media having instructions stored thereon that, when executed by a processor of a system, the instruction cause the system to perform operations including:
  executing object code comprising software instructions that when executed create an instance of an external segment of software instructions that is to perform business logic, wherein a name of the external segment of software instructions is to be first received during runtime of the object code;
  wherein the software instructions that when executed create an instance of an external segment of software instructions that is to perform business logic comprises software instructions that:
  receive a name of a cloud flow; and
  create an interview of the named cloud flow.

14. The non-transitory computer readable storage media of claim 13, wherein the object code comprises software instructions to:
  receive a value that is the name of the external segment of software instructions;
  create a named external segment of software instructions by binding the received value as the name of the external segment of software instructions; and
  create an instance of the named external segment of software instructions responsive to binding the received value as the name of the external segment of software instructions.

15. The non-transitory computer readable storage media of claim 14, further comprising a class including software instructions that when executed create the instance of the named external segment of software instructions that is to perform business logic, wherein the name of the external segment of software instructions is not known at the time of receiving the class.

16. The non-transitory computer readable storage media of claim 15, further comprising software instructions to compile the class into the object code for execution.

17. The non-transitory computer readable storage media of claim 14, wherein the class comprises a class written in a multi-tenant, on-demand, programming language to be executed by the processor on a cloud-computing platform server.

18. The non-transitory computer readable storage media of claim 13, further comprising software instructions that receive a globally unique namespace prefix associated with the name of the cloud flow, and wherein the software instructions that create an interview of the named cloud flow include software instructions to create an interview of the named cloud flow associated with the received globally unique namespace prefix.

19. The method of claim 1, further comprising software instructions that receive a globally unique namespace prefix associated with the name of the cloud flow, and wherein the software instructions that create an interview of the named cloud flow include software instructions to create an interview of the named cloud flow associated with the received globally unique namespace prefix.

20. The method of claim 2, further comprising:
  receiving a class including software instructions that when executed create the instance of the named external segment of software instructions that is to perform business logic, wherein the name of the external segment of software instructions is not known at the time of receiving the class.

* * * * *